United States Patent
Eversull

[15] 3,673,379
[45] June 27, 1972

[54] MOTOR VEHICLE WARM-UP AND BATTERY CHARGER SYSTEM

[72] Inventor: Richard F. Eversull, 5009 Ogallala Place, Cheyenne, Wyo. 82001

[22] Filed: March 20, 1970

[21] Appl. No.: 21,382

[52] U.S. Cl. ...................................................219/202
[51] Int. Cl. .................................................B60l 1/02
[58] Field of Search ..................219/202, 205, 208, 279; 123/142.5 R, 142.5 E; 237/12.3 B, 8 A; 165/42, 43

[56] References Cited

UNITED STATES PATENTS

| | | | |
|---|---|---|---|
| 1,550,524 | 8/1925 | Eremeeff | 219/202 |
| 1,659,050 | 2/1928 | Sasseman | 320/5 |
| 1,759,389 | 5/1930 | Bowen | 219/205 |
| 2,427,713 | 9/1947 | Caldwell | 219/20 |
| 2,440,369 | 4/1948 | Furman | 123/142.5 |
| 2,819,373 | 1/1958 | Allman | 219/20 |
| 2,918,558 | 12/1959 | Evans | 219/20 |
| 3,418,450 | 12/1968 | Schott | 219/279 |
| 3,421,576 | 1/1969 | Roane | 165/23 |
| 3,453,518 | 7/1969 | Rose et al. | 320/5 |
| 3,469,072 | 9/1969 | Carlson | 219/202 |

FOREIGN PATENTS OR APPLICATIONS

| | | | |
|---|---|---|---|
| 346,080 | 4/1931 | Great Britain | 219/205 |
| 400,246 | 10/1933 | Great Britain | 320/5 |

Primary Examiner—J. V. Truhe
Assistant Examiner—Dale R. Peterson
Attorney—Reilly & Lewis

[57] ABSTRACT

A utility system for motor vehicles can be energized by remote control and is especially useful in cold weather for charging a battery and heating the engine and interior of the vehicle without starting the engine. A battery charger furnishes the necessary DC power and is connected to simultaneously charge the vehicle battery and run the blower while the engine heater is on; or, in the alternative, will only charge the battery in response to the setting of a selector switch in the vehicle. Preferably, a cable carries AC power from a building to the vehicle and a switch at the building turns the system on and off. A alarm is activated if entry is made into the vehicle without disconnecting the power cable which is plugged into the vehicle.

2 Claims, 1 Drawing Figure

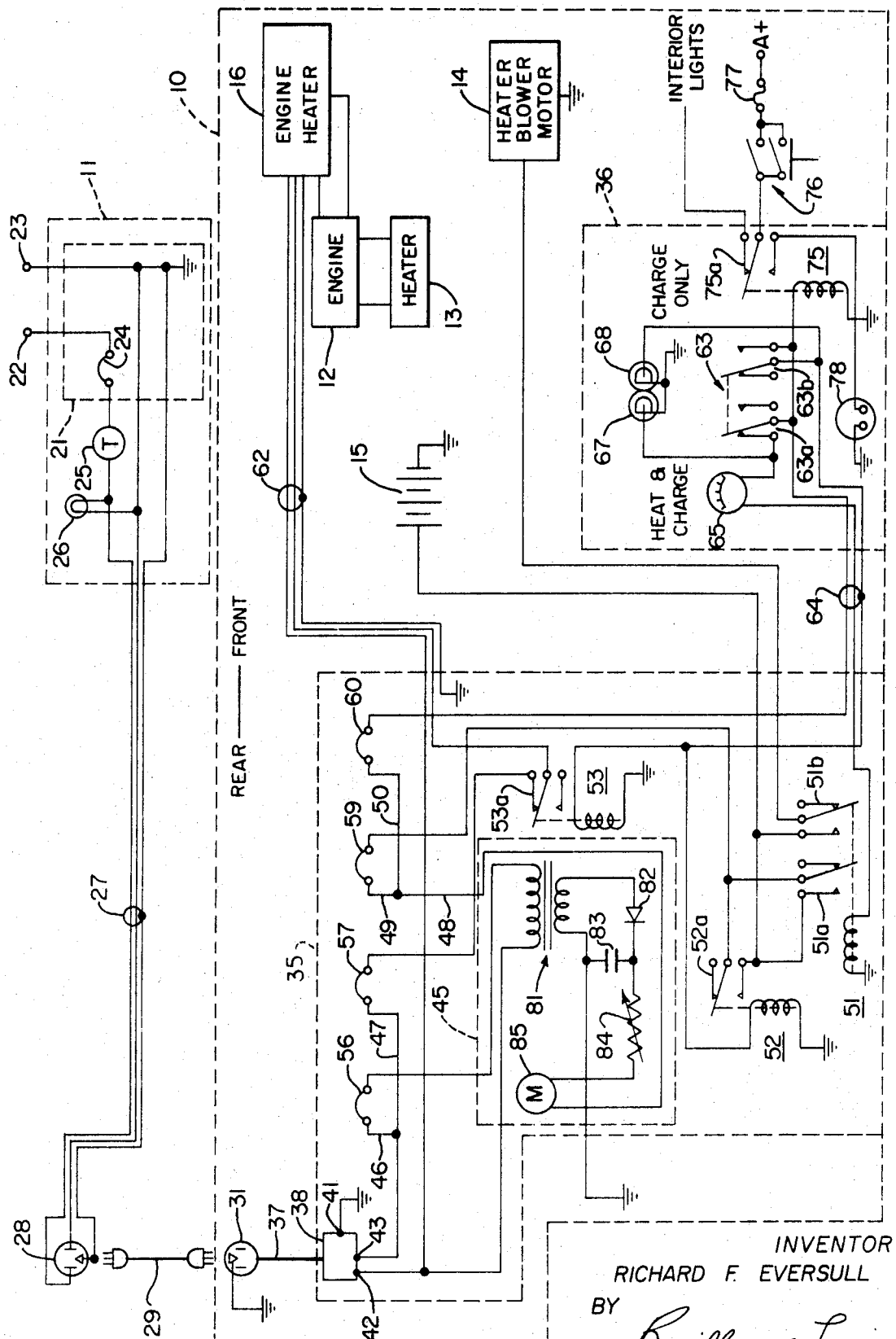

MOTOR VEHICLE WARM-UP AND BATTERY CHARGER SYSTEM

This invention relates to motor vehicle accessory systems and more particularly to a motor vehicle warm-up and battery charger system to facilitate cold weather vehicle heating and charging of the battery prior to starting the engine.

Under cold weather conditions, the starting of motor vehicles is extremely difficult and many times impossible. Further, there is a distinct hazard or danger in driving a vehicle which has not been first warmed and in which the windshield is not adequately defrosted or cleaned from ice, snow and the like. Where garages or carports are available this problem is minimized to a degree. However, there are many instances in which garages, carports, and similar car storage facilities are not available or not heated. Mobile home dwellers, for example, generally do not have space for a garage and therefore are unable to start out in cold weather in the warmth and comfort of a car with a defrosted windshield and a fully charged battery. Some attempts have been made to provide remote control engine starting systems which operate by actuating a switch from within the house. However, there are certain disadvantages attendant to starting an engine and leaving it running over the necessary period of time to produce satisfactory warm-up including the exhaust discharge and deleterious effects on the engine.

Accordingly, it is an object of this invention to provide a novel and improved vehicle accessory unit which serves as a low-cost substitute for a garage or carport.

Another object of this invention is to provide an improved motor vehicle battery charger and warm-up system which may be readily operated by remote control, without starting the car engine, so that the vehicle may be safely and efficiently heated and the battery charged in a dependable manner.

Still another object of this invention is to provide a novel and improved warm-up and battery charger system for a motor vehicle which is simple in construction, utilizes readily available components, can be activated from a remote point and automatically regulated with the necessary builtin safety features to avoid unduly prolonged heating or charging and circuit failures.

Still a further object of this invention is to provide a heating and battery charger system for a motor vehicle which is readily connected into a conventional AC power socket using conventional cables which is capable of charging the battery or simultaneously charging the battery and heating the engine and interior of the vehicle without starting the vehicle.

In accordance with a preferred embodiment of the present invention, there is provided a circulation-type engine block heater coupled to the engine block to heat and circulate the coolant in the engine and control circuits on the vehicle to selectively energize an engine heater and heater blower motor at the same time and in such a way as to circulate warm air through the interior of the vehicle and defrost the windshield. A battery charger is connected in the circuit to simultaneously charge the battery and drive the blower motor when the engine block is being heated or charge the battery only in response to setting of a manually operated selector switch located on the dash. The system is initially energized by a control switch usually in an adjoining building, with the electric power being connected by a cable to the vehicle and plugged into an electric socket mounted on the vehicle. An alarm signal indicates if the cable is connected to the vehicle when entry is made into the vehicle.

Other objects, advantages and capabilities of the present invention will become more apparent as the description proceeds taken in conjunction with the accompanying drawings in which:

The drawing is a block and schematic circuit diagram of a vehicle warm-up and battery charger system embodying features of the present invention.

Referring now to the drawings, the reference numeral 10 designates a motor vehicle and numeral 11 designates an adjacent building installation, such as, a house. The conventional motor vehicle is equipped with an engine represented at 12 containing a coolant in its water jacket which circulates through the engine block and through the coils of the vehicle heater represented at 13 to heat the interior of the vehicle. A heater blower motor, provided as standard equipment in most vehicles and represented at 14, circulates air over the coils of the heater 13 so as to heat the interior of the vehicle and defrost the windshield as desired. The motor vehicle is also equipped with a DC storage battery represented at 15 which normally supplies electric power to a variety of loads on the vehicle, such as, the headlights, starter, etc. A circulation-tank type engine coolant heater 16 is connected into the engine block to heat and circulate the coolant through the engine 12 and heater 13. For the purpose of illustration, the engine block heater 16 may be of the type manufactured by the Phillips Manufacturing Company Model No. U450T and includes an internal thermostat which will automatically shut off the engine heater by opening the power circuit once a preselected maximum temperature is reached and automatically reset when a preselected lower temperature is reached. The engine block heater 16, battery 15 and blower motor 14 are thus the load devices of the accessory or utility system described hereinafter.

To furnish electric power to the vehicle there is represented a circuit breaker panel 21 in the house 11 to which is supplied electric power from suitable power service lines to input terminals 22 and 23, terminal 22 being the live or hot terminal and terminal 23 being the neutral terminal which is connected to an AC ground. All of the other grounds represented in the circuit diagram are a DC chassis ground. The circuit breaker panel 21 includes a manual reset switch 24 which is manually operated to alternately connect and disconnect the power from the terminals 22 and 23 to the utility system hereinafter described and will open the circuit in the event of an overload and can be manually reset. As an optional feature, an electric timer 25 may be connected in the hot line to terminal 22 to turn the system on or off after a particular time interval. A pilot light 26 may be connected across the hot terminal 22 and grounded terminal 23 to indicate that an AC cable 27 is energized. Cable 27 is a 3-wire cable and is connected between the 3-line system shown in the house to three terminals in an outdoor socket or receptacle 28 disposed at a convenient location outside the house. Three-wire conductor cable is used throughout the system to comply with National Electrical Code Standards and protects users against an electrical shock, and polarized AC receptacles or connectors are used so that the hot and neutral terminals cannot be interchanged. The vehicle chassis is held at AC ground potential by a third conductor grounding circuit which ties the neutral and ground to inlet terminal 23 which connects to the source of electric power. An interconnecting three-wire cord 29 shown with male plugs at each end releasably connects into socket 28 and socket 31 on the vehicle, the latter being preferably located below the trunk lid to define input terminals which supply electric power to the control circuits mounted on the vehicle described more fully hereinafter.

The control circuits for the electric power supplied from the house to the load devices on the vehicle are preferably arranged in two separate housings, such as, a box or housing 35 located in the truck and a box or housing 36 located on or adjacent to the dash. The AC power to inlet socket 31 is connected by a conventional three-wire cord 37 to an inlet receptacle 38 in the trunk box 35. The inlet receptacle has an outlet terminal 41 connected to a DC vehicle chassis ground, a neutral terminal 42 and a positive or output terminal 43.

An AC circuit is completed from output terminal 43 over line 46 to apply AC power to a battery charger unit 45 in the trunk box 35, and another AC circuit is completed from terminal 43 over line 47 to apply AC power to the engine heater 16. An output line 48 of the charger unit 45 applies DC power from the battery charger unit to the blower motor 14 and battery 15 via line 49. Another DC circuit is completed through line 48 via line 50 to apply DC power from the battery charger unit to the coils of relays 51, 52 and 53 located in the trunk box 35.

AC circuit breakers 56 and 57 located in trunk box 35 are connected in lines 46 and 47, respectively, and DC circuit breakers 59 and 60 located in box 35 are connected in lines 49 and 50, respectively, to protect all powered circuitry, relays and switches against overload, such overloads may be caused by component malfunctions or short circuits. The circuit breakers illustrated preferably are a combination circuit breaker and switch of the manual re-setting type which can manually open each of their respective circuits and protect the power circuit which ultimately terminates in the load devices and may be manually reset.

The AC circuit applying power to the engine heater 16 includes a normally closed contact 53a of relay 53 and a three-wire cable 62 extends from the housing 35 to the engine heater 16. One of the wires of the cable 62 leads into a DC vehicle chassis ground in housing 35 and the other to neutral terminal 42. In this way when the AC power is applied via the cable 27, 29 and 37 to the receptacle 38 the engine heater 16 is turned on and will continue to run until its internal thermostat, now shown, shuts it off when the engine reaches a preselected temperature.

The DC circuit for applying power to the battery 15 and blower motor 14 includes one set of normally open contacts 51a of relay 51 to selectively close DC power circuit to the battery, and another set of normally open contacts 51b in series with contacts 51a to selectively close the power circuit into the blower motor. Thus, when relay 51 is energized the blower motor and battery are connected in parallel with one another and across the output of the battery charger unit 45. Also, a set of normally open contacts 52a of relay 52 are connected in the circuit from DC line 49 to the battery 15.

Selective actuation of the relays 51, 52 and 53 is provided by a two-position or double pole, double throw manually operated selector switch 63 located in the dash box 36 with a three-wire cable 64 extending between trunk box 35 and dash box 36 to interconnect DC power between the two unit boxes. In the cable 64, DC power line 50 is connected to each of two sets of contacts 63a and 63b of switch 63 to establish two circuits in parallel with line 50, contacts 63a supplying DC power to the coil of relay 51 over a second line of the cable and contacts 63b supplying DC power to the coils of relays 52 and 53. In one position, the control switch 63 has contacts 63a closed and contacts 63b open to apply DC power to the coil of relay 51 whereby to apply power to all of the load devices, and this position is hereinafter referred to as the "heat and charge" mode of operation. In the other position for switch 63, contacts 63b are closed and contacts 63a are open to deenergize coils 51 and energize coils 52 and 53, the latter setting being the "charge only" mode of operation. Energization of relays 52 and 53 opens the circuit to the engine heater 16 and closes the circuit to the battery 15. A thermostat switch 65 located in box 36 is connected in the line between contacts 63a and the coil of relay 51 and, opens the circuit to deenergize coil 51 and, when the temperature in the vehicle reaches a preselected value, automatically cut off the power to the blower 14 and battery 15 during the "charge and heat" mode. When the temperature falls to a preselected lower valve the thermostat switch 65 once again closes the circuit and thus maintains the temperature inside the vehicle within a preselected range. A pilot light 67, preferably of the neon type, is located between the line contact of set 63a and a DC chassis ground to indicate when operating in the "heat and charge" mode, and a pilot light 68 is located between the movable contact of set 63b and ground to indicate when operating in the "charge only" mode.

A relay 75 in housing 36 is connected to line 50 and has contacts 75a connected between door switches 76 on the vehicle, the latter switches receiving DC power from battery 15 indicated at terminal designated A+ through a fuse block 77 and an electric bell or buzzer alarm 78. As a result, if the AC power remains applied to the system when cable 29 is plugged in and the door is opened, switch 76 is closed and the power at terminal A+ is applied to an alarm 78. The other setting of contacts 75a connects power to the interior lights of the vehicle via the fuse 77 and switch 76. If the vehicle operator should forget to disconnect the AC power cable 29 from the vehicle, the instant the door is opened the alarm 78 is activated and the interior lights are not energized to warn the operator.

The battery charger unit 39 shown includes a stepdown transformer 81 having a primary winding connected across the output and neutral terminals 42 and 43, and the leads from a secondary winding have a rectifier 82 and a filter capacitor 83 connected in series with one another across the secondary winding. A series-connected, adjustable resistor 84 and a current indicating meter 84 are connected in series with the rectified output of the transformer and lead into output line 48. In turn, meter 85 will indicate the charge rate of the battery charger unit. The battery charger functions to convert the AC power input to DC power at a voltage level such as, 12 volts DC, which will charge the battery, and power the relay coils and the motor of the heater blower.

The system affords the option of installing a time clock-activated switch represented at 25 in the building 11 or near the power feed input terminals to activate the system. This allows the system to be set by the user at night and it would not commence to operate until, as for example, two hours prior to the time the user expected to depart in the morning. In the alternative, the system may be activated by the manual circuit breaker 24 in the house or any switch at the power outlet which is cable connected to the vehicle receptacle 31 to selectively apply 110V AC power to the system.

In the full sequence of operations of the above described utility system the vehicle 10 is parked adjacent or in the vicinity of the outlet receptacle 28 and cable 29 is plugged into the outdoor receptacle 28 and the receptacle 31 on the vehicle. With circuit breaker 24 closed the AC power is applied to the engine heater which begins to heat and circulate the coolant in the engine block. If the dash-mounted selector switch 63 is set in the "heat and charge" mode with contacts 63a closed, as shown, the coil of relay 51 is energized to close contacts 51a and 51b so that DC power is simultaneously applied from the battery charger to the battery 15 and to the motor of blower 14. The engine will continue to heat until a preselected higher temperature is reached at which time the internal thermostat in the heater 16 will shut off until a preselected lower temperature is reached and it again turns on automatically. At the same time the heater blower will continue to run until a preselected upper temperature is reached in the interior of the vehicle. At the upper temperature limit, thermostat switch 65 opens the power circuit to the coil of relay 51 at which time the blower stops and the charging of the battery ceases until the temperature in the vehicle drops to a preselected lower temperature and thermostat switch 65 closes and the relay 51 is again energized. Pilot lamp 67 will be on when system is in the "heat and charge" mode of operation.

In the alternative or "charge only" mode, switch 63 is moved to the other setting to close contacts 63b and open contact 63a so that power is no longer applied to energize relay 51 and with this setting relays 52 and 53 are energized. This opens contacts 53a to de-energize the engine heater 16 and closes contacts 52a to apply the DC power to the battery 15 so it is charged by charger 45. Pilot light 68 indicates when contacts 63b are closed.

In either mode of operation DC power is applied via cable 64 to energize relay 75 to set the contacts 75a to a position to connect the alarm 78 to the A+ DC power when the door is opened which will close switch 76. Closure of switch 76 when it is energized will thereby cause actuation of the alarm 78. However if cable 29 has been disconnected from socket 31 then relay 75 is not energized and the contacts 75a connect at the A+ power to the interior lights when door switch 76 is closed. In the event of an overload in any of the circuits leading to the battery charger 45, the engine heater 16, the relay coils, and the battery or the heater blower are automatically opened by the associated overload protectors 56, 57, 59 and 60.

Although the present invention has been described with a certain degree of particularity, it is understood that the present disclosure has been made only by way of example and that changes in details of structure may be made without departing from the spirit and scope thereof.

I claim:

1. A warm-up and battery charger system for a motor vehicle having an engine with a jacket containing a coolant, a heater coupled to the jacket for receiving coolant passing between the heater and jacket, a blower for the heater, and a battery; said system comprising a circulation tank-type coolant heater arranged for heating the coolant in the engine, a battery charger on the vehicle, an input socket defining input terminals on the vehicle for supplying AC power, a battery charger on the vehicle connected to the input terminals for converting from AC power to DC power, and power control circuit means on the vehicle having a first power circuit connected between the input terminals and the engine heater and including a first set of normally closed relay contacts, a second power circuit connected between the input terminals and the battery charger, a third power circuit between the battery charger and the battery and blower motor including a second set of normally open relay contacts leading to the battery and third and fourth sets of normally open relay contacts leading to the battery and blower, said third and fourth sets of contacts connected between the battery charger and the battery and said third set of contacts connecting through said second set to the blower, a fourth power circuit connected between the battery and a coil associated with each of said relay contacts, the relay coils of said first set and second sets of contacts being connected in parallel with one another, and a selector switch on the vehicle having a first and second set of switch contacts connected in said fourth circuit to alternately energize the coils of said first and second sets of relay contacts to charge the battery only in one mode of operation and alternately energize coils of said third and fourth sets of relay contacts to simultaneously charge the battery and energize said blower and said engine heater, and a thermostat switch in the vehicle connected in the fourth circuit in series with the relay coil for said third and fourth sets of contacts to automatically control the charging of the battery and regulate energization of the blower within selected temperature ranges within the vehicle.

2. A warm-up and battery charger system as set forth in claim 1 wherein said relays are located in a housing in the trunk and said selector switch and thermostat switch are located in a housing adjacent the dash in the interior of the vehicle.

* * * * *